United States Patent Office 3,156,506
Patented Nov. 10, 1964

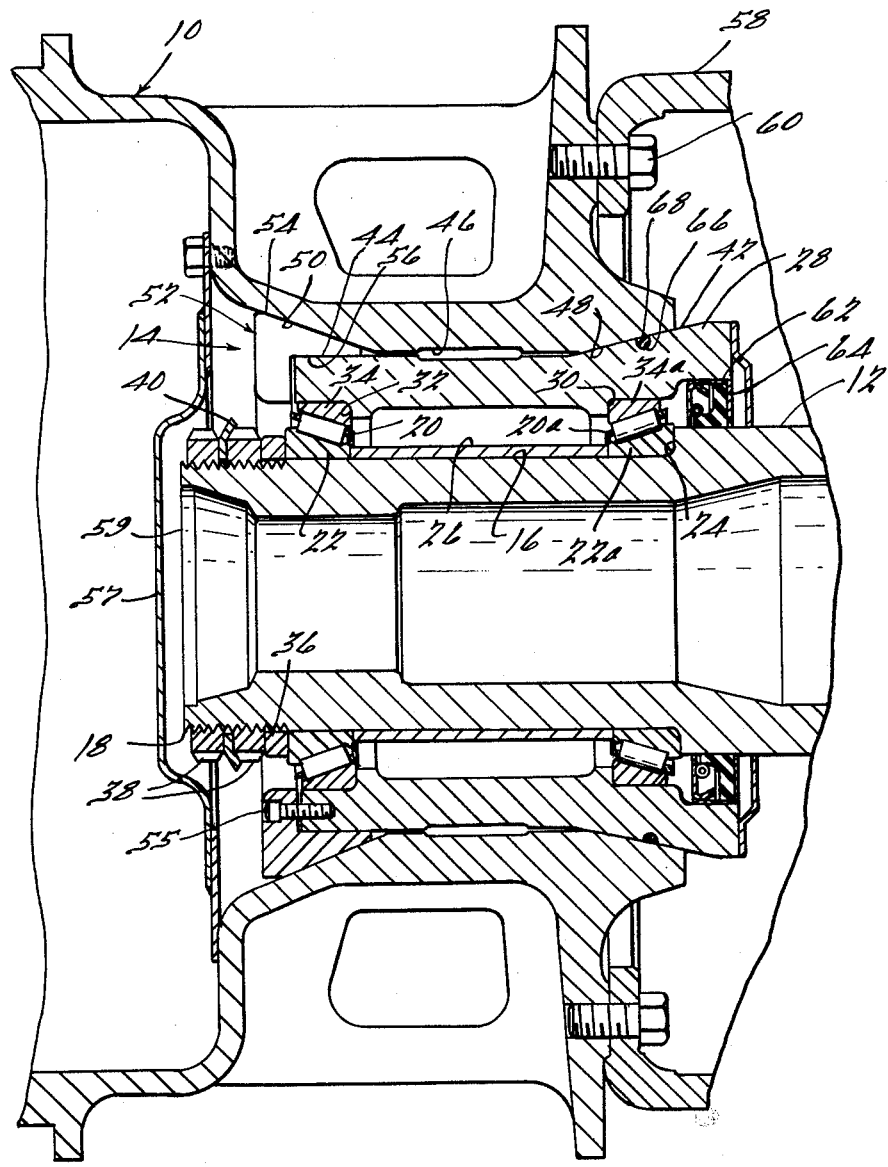

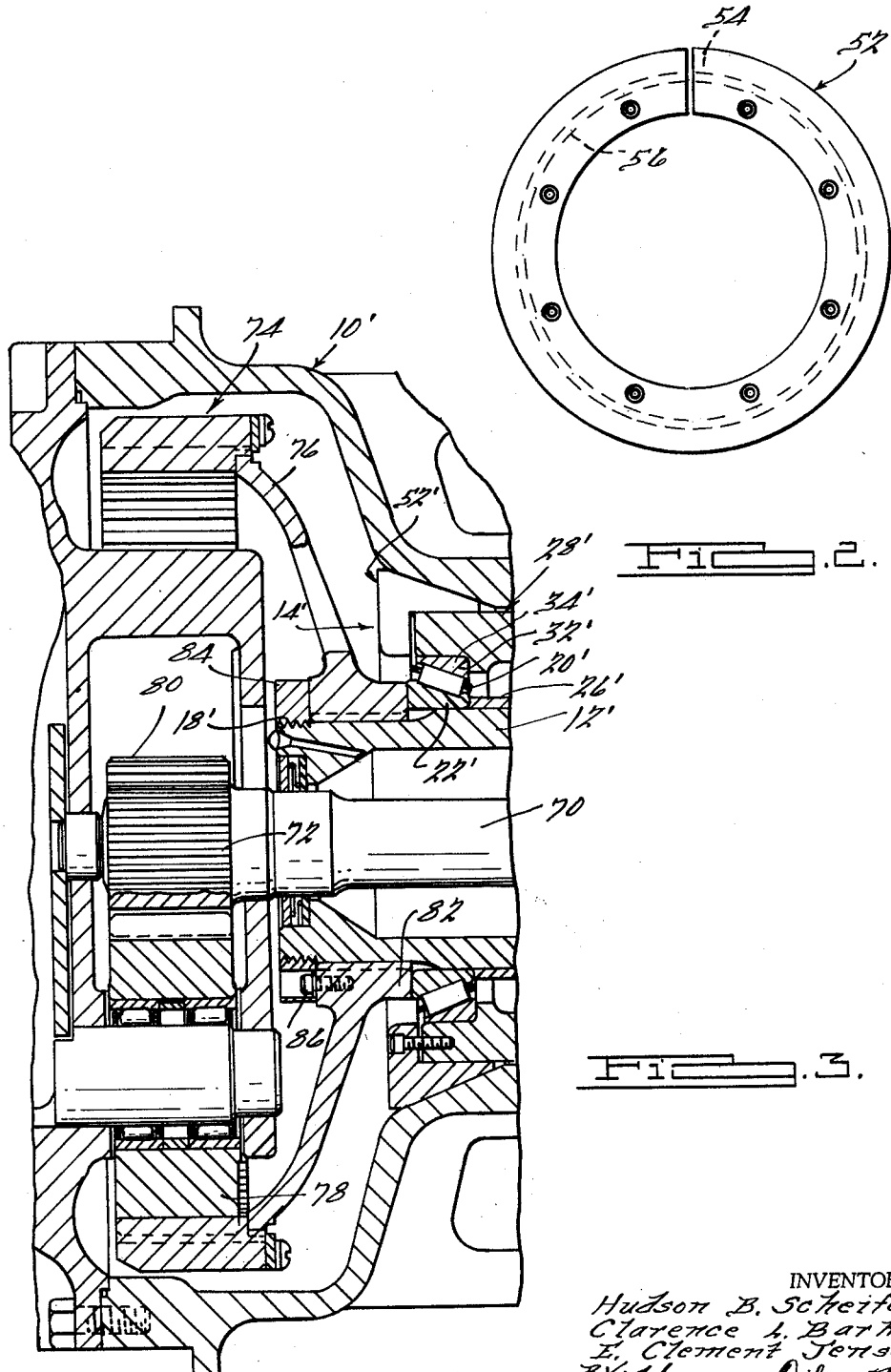

3,156,506
WHEEL AND BEARING ASSEMBLY
Hudson B. Scheifele, Grosse Pointe, and Clarence L. Barker and Elmer Clement Jensen, Birmingham, Mich., assignors to Federal-Mogul-Bower Bearings, Inc., Detroit, Mich., a corporation of Michigan
Filed May 18, 1962, Ser. No. 195,822
7 Claims. (Cl. 308—211)

This invention relates to a bearing assembly and more particularly to a bearing assembly for use on heavy earth-moving or other type of automotive vehicles.

A serious bearing problem has developed in the installation of bearings for wheels both driven (dead axle) and powered (live axle) on huge earth-moving equipment vehicles which very often are used in off-the-road applications. The problem is concerned with the determination of the amount of preload or free play of wheel bearings. Preload is caused by putting a relative axial force between the inner and outer races of a bearing; excessive preload can cause bearing failure. Free play is the amount of relative travel which the wheel hub can make relative to the wheel bearings; excessive free play allows improper seating and improper load distribution of the rollers causing premature bearing failure. In assembling a wheel and bearing assembly to a spindle where the wheel is of the normal size as, for example, with the average automobile, the adjustment of the bearings can be determined by "feel." However, with the large earth-moving equipment of current design, the wheels are of such enormity as to preclude the assembly of the wheel and bearings with any positive assurance of the preload or free play applied to the bearings. As a result, oftentimes the preload or free play is excessive thereby causing premature bearing failure. The above problem is present on initial assembly as well as in situations in which the wheel must be pulled for repair, adjustment of brakes, etc., and then reassembled. To alleviate the above problems, a novel bearing assembly has been provided whereby excessive preloading or excessive free play of the wheel bearings is prevented. Therefore, it is an object of this invention to provide a novel bearing assembly whereby a predetermined preload or free play is provided for the wheel bearings.

It is a further object of this invention to provide a novel bearing assembly for use with wheels of large size and mass such as used on earth-moving equipment vehicles and in which a desired predetermined preload or clearance relationship is set between the wheel and the bearings.

It is a further object of this invention to provide a novel bearing assembly which allows the wheel and brake drum to be removed without disturbing the bearings and seal.

It is to be noted that while the features of this invention are described relative to an application for large earth-moving equipment, some of these features are equally applicable to passenger cars, since, even in the assembly of wheel bearings and wheels on the spindles of passenger cars, it has been known that an excessive preload or free play has been applied.

Since with the subject invention, a simple unitary assembly is to be used, the assembly of wheel bearings to the vehicle is facilitated. Therefore, it is another object of this invention to provide a novel bearing assembly for use on dead or live axles which provides for ease of assembly while maintaining a preselected preload or clearance relationship between the bearings and the wheels.

Other objects, features and advantages of the present invention will become apparent from the subsequent description and the appended claims, taken in conjunction with the accompanying drawings, in which:

FIGURE 1 is a side elevational view of a bearing assembly embodying the features of this invention as shown in assembly relationship with a spindle (partially shown) and the hub of a wheel (partially shown) of a dead axle application;

FIGURE 2 is a front view of the split ring member used in the bearing assembly of FIGURE 1; and FIGURE 3 shows the bearing assembly as shown in FIGURE 1 in assembly relationship with a live axle application.

Looking now to FIGURE 1, a wheel hub 10 (partially shown) of a dead axle wheel of an earth-moving vehicle is shown to be rotatably mounted about a spindle member 12 (partially shown) by means of a bearing assembly generally indicated by the numeral 14. The spindle 12 has at its outer end a reduced diameter portion 16 which in turn terminates in a threaded portion 18. A pair of roller bearings 20, 20a each having a plurality of roller members radially disposed about inner race members 22, 22a, respectively, which are slidably disposed with a slip fit upon the reduced diameter portion 16. The innermost one of the bearings 20a is disposed in abutting relationship with a shoulder 24 defined by the juncture of the reduced diameter portion 16 and the remainder of the spindle 12. A spacer sleeve 26 is of an inside diameter to provide a slip fit over the reduced diameter portion 16 and is disposed between the bearings 20, 20a, engaging their inner race members 22, 22a. The sleeve 26 is of a preselected length to maintain the bearings 20, 20a a preselected distance from each other.

An outer hollow sleeve member 28 has an inside diameter greater than the diameter of the reduced diameter portion 16 and has formed on its radially inner surface a first axially inwardly facing shoulder 30 near the inward end of the outer sleeve 28 and an axially outwardly facing shoulder 32 formed near the outer end of the outer sleeve member 28. Outer races 34, 34a of bearings 20, 20a, respectively, are located with a slight frictional fit in annular recesses in the outer and inner ends, respectively, of the outer sleeve 28 and are engageable with the shoulders 32, 30, respectively.

The assembly just described, i.e. bearings 20, 20a inner sleeve 26 and outer sleeve 28, is secured to the spindle 12 by means of an annular spacer 36 which can be slipped over the threaded portion 18 of the spindle 12 and is engageable with the inner race 22 of the outer bearing 20. A pair of lock nuts 38 with a lock washer member 40 disposed therebetween are threaded upon the threaded portion 18 and tightened against the spacer 36 thereby applying an axial thrust to the inner race 22 of the outer bearing 20 through the inner sleeve member 26 to the inner race 22a of the inner bearing 20a and against the shoulder 24 of the spindle 12 and thereby locking that assembly to the spindle.

In order to provide for the proper dimensional relation between the outer races 34, 34a, and the inner races 22, 22a, respectively, the shoulders 30 and 32 are formed at a preselected distance from each other relative to the predetermined length of the inner sleeve 26; thus, while the outer sleeve 28 cannot be axially removed from the bearings 20, 20a, the outer race members 34, 34a are maintained in a preselected positional relationship with respect to the inner races 22, 22a, which relationship fixes the preload or free play of bearings 20, 20a.

Thus far it can be seen that the outer sleeve member 28 is rotatable via the bearings 20, 20a about the stationary spindle 12. The outer sleeve member 28 is provided at its inner end with an axially inwardly extending and radially outwardly inclined or frustoconically shaped surface 42 while the external surface 44 at the outer end of the sleeve member 28 is provided with a generally straight, circular contour. The wheel hub 10 is modified from its conventional shape and is provided with a central through bore 46 which terminates at its inner end in a surface portion 48 which is complementarily contoured with respect to the inclined surface portion 42 thereby providing for matable engagement of those surfaces. The outermost end of the through bore 46 terminates in an axially outwardly extending, radially outwardly inclined or frusto-conically contoured surface portion 50. The wheel hub 10 is axially secured to the outer sleeve member 28 by means of a radially split ring member 52 (see FIGURE 2). The split ring member 52 has its outer surface 54 contoured to a generally frusto-conical shape which is similar to that of the inclined surface 50 at the outer end of the through bore 46 and is thus matable therewith. The split ring member 52 is counterbored on its inner end as indicated by the surface 56 and is of a size to slip snugly over the straight circular portion 44 at the outer end of the outer sleeve member 28. The ring 52 is axially split in order to facilitate installation of the ring member 52 matably within the gap between the surface 50 of the wheel hub 10 and the straight portion 44 of the outer sleeve member 28. The split or lock ring member 52 is secured to the outer sleeve member 28 by means of a plurality of radially disposed bolts 55 which are threadably engaged within the outer end face of the outer sleeve member 28. Thus, with the bearings 20, 20a, inner sleeve 26 and outer sleeve 28 secured to the spindle 12 in a manner as previously described, the wheel hub 10, and hence the wheel assembly, can be slipped over the outer sleeve member 28 until surface 48 on the wheel hub 10 is in engagement with the similarly inclined surface 42 of the outer sleeve member 28. Then the split ring member 52 is disposed in between the straight circular end portion 44 of the outer sleeve member 28 and the inclined surface 50 at the outer end of the hub 10. In finally securing the split ring member 52 to the outer end of the outer sleeve member 28, the hub 10 with its associated wheel is moved axially inwardly until the inclined surface 48 is in a tight frictional engagement with the inclined surface 42 of the outer sleeve member 28 while the frusto-conical surface 50 of the wheel hub 10 is in tight frictional engagement with the inclined surface 54 of the split ring member 52. Note that regardless of the amount of axial inward movement of the split ring member 52 to cause further tightening of the hub 10, the preload on the bearings 20, 20a, is not changed. This preload then is determined solely by the preselected dimensional relationship between the inner sleeve member 26 and the shoulders 30 and 32 of the outer sleeve member 28.

The outer end of the wheel hub 10 is closed by means of a cover plate 57 which is bolted or otherwise secured thereto. A brake drum member 58 is secured to the inner end of the wheel hub 10 by means of a plurality of radially disposed bolts 60.

The axially inner face of the outer sleeve member 28 is provided with an annular recess 62 for receiving an annular seal member 64. The annular seal 64 provides a fluid tight seal between the recess 62 of the outer sleeve member 28 and the spindle 12. An annular groove 66 is provided in the inclined surface 42 of the outer sleeve member 28 and disposed therein in an O-ring seal member 68, thus providing a fluid tight seal between the inclined surface 42 of the outer sleeve member 28 and the mating, inclined surface 48 of the hub member 10. With the seals 64 and 68, lubricant can be maintained generally within the volume of the through bore 46 of the wheel hub 10 and is prevented from entering into the volume of the brake drum 58. An end plug 59 located in the end of the hollow spindle 12 prevents lubricant from entering therein. The lubricant for lubricating the bearings 20, 20a is free to be dispersed between the mating inclined surfaces of the hub 10 and of the split ring member 52 and of the outer sleeve member 28. The lubrication between these mating surfaces prevents fretting corrosion caused by the high wheel loads and also facilitates disassembly of those mating parts.

Note that in the assembly as shown in FIGURE 1, the wheel hub 10 along with its corresponding wheel assembly can be removed from the bearing assembly 14 by simply removing the split ring member 52 and then slipping off the wheel hub 10. Note, also, that this in no way disturbs the relationship of the bearings 20, 20a and of the seal 64. The wheel hub 10 can be reassembled without disturbing the bearings 20, 20a and without the necessity of changing the seal. If, for any reason, one of the bearings 20, 20a is to be replaced, the entire assembly 14 can be removed and reassembled under the proper preload and the hub 10 subsequently installed in a manner as previously described. With this construction, it can be seen that the proper preload of the bearings 20, 20a is insured and that excessive free play is prevented.

In the assembly as shown in FIGURE 1, the wheel hub 10 is a driven wheel and is free to rotate about the spindle 12 via the assembly 14. The frictional connection between the inclined surfaces 42, 48 and 54, 50, are sufficiently high such that no relative rotation occurs therebetween since the bearings 20, 20a provide an extremely low frictional means for rotation of the hub 10 with the outer sleeve member 28. Thus no additional structure is required to radially lock the hub 10 to the outer sleeve 28. Note that with the brake drum 58 and the associated brake assembly disposed on the inboard side, the hub 10 must be pulled or removed to service the brakes. With the construction as described, this procedure presents no problem as to bearing preload or free play.

In addition to the advantages previously mentioned, note that the inclined surfaces 42 and 54 are located substantially radially concentrically about the bearings 20a and 20, respectively; thus upon assembly of the wheel hub 10, the inclined surfaces 48 and 50 are located substantially concentrically relative to the bearings and thereby allow the wheel loads to be distributed directly over the bearings 20, 20a, hence prolonging bearing life.

In the assembly shown in FIGURE 1 the invention is shown in conjunction with a driven wheel; a somewhat similar installation can be provided with a powered wheel as shown in FIGURE 3.

In the embodiment shown in FIGURE 3, structure which is similar to that of FIGURE 1 and which functions in a similar manner is indicated by the same primed number. Thus, looking now at FIGURE 3, a spindle member 12' terminates in a threaded end portion 18' and has disposed thereon a bearing assembly 14' which comprises a pair of bearings (only one, 20', of which is shown) which have their inner races (only one, 22', is shown) maintained at a preselected distance by means of an inner sleeve 26' and their outer races (only 34' shown) maintained at a preselected distance by means of an outer shoulder 32' and an inner shoulder (not shown) disposed internally of an outer sleeve member 28'. A wheel hub member 10' is secured to the outer sleeve member 28' by means of a split ring member 52' which is removably secured to the outer end of the outer sleeve member 28'.

An axle shaft 70 extends through and beyond the spindle 12' and terminates in a splined outer end 72. The innermost end of the axle shaft 70 (not shown) is engaged to a source of rotational power by conventional means (not shown). The axle shaft 70 is engaged by means of the spline 72 into a planetary gear assembly 74 by which the wheel hub 10' and hence the wheel associated therewith can be rotated in accordance with rotation of the axle shaft 70.

As shown in FIGURE 3 the planetary gear assembly 74 comprises a ring gear 76 which is splined or otherwise fixedly secured near the outer end of the spindle 12', a plurality of planetary gears 78, and a sun gear 80 which is in splined engagement with the splined end portion 72 of the axle shaft 70. The planetary gear assembly 74 operates in a manner well known in the art and need not be described here in detail except to indicate that rotation of the axle shaft 70 provides rotation of the wheel hub 10' in accordance with the gear ratio as provided by the planetary gear assembly 74. An annular hub 82 of the ring gear 76 abuts against the inner race member 22'. The ring gear 76 is retained to the splined portion of the spindle 12' by means of a nut 84 which is threaded upon the threaded position 18' of the spindle portion 12'; the nut 84 can be locked by means of a transversely extending bolt 86 threadably engaged with the outer face of the spindle 12'. By tightening the nut 84 the ring gear 76 and hence the hub 82 is moved axially inwardly along its spline into engagement with the inner race member 22' and thereby tightly secures the bearings and the inner sleeve members 26' to the spindle 12'. The function and operation of the bearing assembly 14' is similar to that as previously described in conjunction with the embodiment as shown in FIGURE 1.

With either embodiment shown in FIGURES 1 and 3, it can be appreciated that bearing assembly can be facilitated on a production line basis since a single cartridge housing the wheel bearings could be easily and readily applied to a spindle whether it be of a passenger car or of a heavy vehicle for moving earth. In any type of application neither an excessive preload nor excessive free play can be applied between the inner and outer races of the bearings, thus preventing premature bearing failure due to these causes.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. The combination comprising a wheel having a hub with a centrally disposed through bore located a substantial distance radially inwardly from the outer periphery of said hub a spindle having axially inwardly disposed shoulder means for providing an engaging surface, a bearing assembly for rotatably supporting said wheel on said spindle comprising a pair of bearings having inner and outer races and having said inner races disposed upon said spindle, an inner sleeve member of a preselected length disposed about said spindle and located intermediate said bearings and in abutting relation with said inner races, an outer sleeve member having a pair of radially internally disposed shoulders axially spaced a preselected distance in accordance with said preselected length of said inner sleeve and having said internally disposed shoulders in abutting relation with said outer races, means disposed on the axially outer end of said spindle for engaging said inner race of the axially outermost one of said pair of bearings and adapted to axially secure said inner races and said inner sleeve against said shoulder means on said spindle, first means located radially a short distance from the internal surface of said outer sleeve member and disposed externally on said outer sleeve member for frictionally engaging a portion of the surface defining a portion of said through bore in said hub for supporting said hub and for limiting relative axial movement between said hub and said sleeve member in one axial direction, a ring member removably secured to the axially outer end of said outer sleeve member, and means disposed externally on said ring member being frictionally engageable with a different portion of the surface defining a different portion of said through bore in said hub for supporting said hub and for limiting relative axial movement between said hub and said ring member in an opposite axial direction, a brake drum, and means securing said brake drum to said hub at its axially inboard side.

2. The combination comprising a wheel, a spindle having an axially inwardly disposed shoulder means for providing an engaging surface, a bearing assembly for rotatably supporting said wheel on said spindle comprising a pair of bearings having inner and outer races and having said inner races disposed upon said spindle, an inner sleeve member of a preselected length disposed about said spindle and located intermediate said bearings and in abutting relation with said inner races, an outer sleeve member disposed concentrically with respect to said inner sleeve member, means on said outer sleeve member for engaging said outer races of said pair of bearings and for spacing said outer races axially a preselected distance in accordance with said preselected length of said inner sleeve, means disposed on the axially outer end of said spindle for engaging said inner race of the outermost one of said pair of bearings and adapted to axially secure said inner races and said inner sleeve against said shoulder mean on said spindle, said outer sleeve member having its axially innermost radially outer surface frusto-conically shaped as defined by an external surface extending axially inwardly and radially outwardly with said external surface located radially a short distance from the internal surface of said outer sleeve member and being disposed substantially in radial alignment with the axially innermost one of said pair of bearings upon assembly of said innermost bearing with said outer sleeve member, and a ring member removably secured to the axially outer end of said outer sleeve member and having a frusto-conically shaped external surface portion defined by a surface extending axially outwardly and radially outwardly and being disposed substantially in radial alignment with the axially outermost one of said pair of bearings upon assembly of said outermost bearing and said ring member with said outer sleeve member, and a hub in said wheel having a through bore defined by a first frusto-conically shaped surface matably frictionally engageable with said frusto-conically shaped surface on said outer sleeve member and with a second frusto-conically shaped surface matably frictionally engageable with said frusto-conically shaped surface on said ring member, a brake drum, means for securing said brake drum to said hub at its axially inboard side.

3. The combination comprising a wheel, a spindle having an axially inwardly disposed shoulder means for providing an engaging surface, a bearing assembly for rotatably supporting said wheel on said spindle comprising a pair of bearings having inner and outer races and having said inner races disposed upon said spindle, an inner sleeve member of a preselected length disposed about said spindle and located intermediate said bearings and in abutting relation with said inner races, an outer sleeve member disposed concentrically with respect to said inner sleeve member, means on said outer sleeve member for engaging said outer races of said pair of bearings and for spacing said outer races axially a preselected distance in accordance with said preselected length of said inner sleeve, means disposed on the axially outer end of said spindle for engaging said inner race of the outermost one of said pair of bearings and adapted to axially secure said inner races and said inner sleeve against said shoulder means on said spindle, said outer sleeve member having its axially innermost radially outer surface frusto-conically shaped as defined by an external surface extending axially inwardly and radially outwardly with said external surface located radially a short distance from the internal surface of said outer sleeve member, and a ring member removably secured to the axially outer end of said outer sleeve member and having a frusto-conically shaped external surface portion defined by a surface extending axially outwardly and radially outwardly, a hub in said wheel having a through bore defined by a first frusto-conically shaped surface matably frictionally engageable with said frusto-conically shaped surface on said outer sleeve member and with a second frusto-conically shaped surface matably frictionally engageable with said frusto-conically shaped surface on said ring member, and means operatively associated with said hub and said spindle for rotatably driving that wheel associated with said hub, a brake drum, and means securing said brake drum to said hub at its axially inboard side.

4. The combination comprising a wheel, a spindle having an axially inwardly disposed shoulder means for providing an engaging surface, a bearing assembly for rotatably supporting said wheel on said spindle comprising a pair of bearings having inner and outer races and having said inner races disposed upon said spindle, an inner sleeve member of a preselected length disposed about said spindle and located intermediate said bearings and in abutting relation with said inner races, an outer sleeve member disposed concentrically with respect to said sleeve member, means on said outer sleeve member for engaging said outer races of said pair of bearings and for spacing said outer races axially a preselected distance in accordance with said preselected length of said inner sleeve, means disposed on the axially outer end of said spindle for engaging said inner race of the outermost one of said pair of bearings and adapted to axially secure said inner races and said inner sleeve against said shoulder means on said spindle, said outer sleeve member having its axially innermost radially outer surface frusto-conically shaped as defined by an external surface extending axially inwardly and radially outwardly with said external surface located radially a short distance from the internal surface of said outer sleeve member, and a ring member removably secured to the axially outer end of said outer sleeve member and having a frusto-conically shaped external surface portion defined by a surface extending axially outwardly and radially outwardly, a hub in said wheel having a through bore defined by a first frusto-conically shaped surface matably frictionally engageable with said frusto-conically shaped surface on said outer sleeve member and with a second frusto-conically shaped surface matably frictionally engageable with said frusto-conically shaped surface on said ring member, and a brake drum secured to said hub at its axially inboard side.

5. The combination comprising a wheel, a spindle having an axially inwardly disposed shoulder means for providing an engaging surface, a bearing assembly for rotatably supporting said wheel on said spindle comprising a pair of bearings having inner and outer races and having said inner races disposed upon, said spindle, an inner sleeve member of a preselected length disposed snugly about said spindle and located intermediate said bearings and in abutting relation with said inner races, an outer sleeve member disposed concentrically with respect to said inner sleeve member, a pair of radially inwardly extending shoulders axially spaced a preselected distance in accordance with said preselected length a said inner sleeve and each being engageable with the outer race of one of said bearings, means disposed on the axially outer end of said spindle for engaging said inner race of the outermost one of said pair of bearings and adapted to axially secure said inner races and said inner sleeve against said shoulder means on said spindle, said outer sleeve member having its axially innermost radially outer surface frusto-conically shaped as defined by an external surface extending axially inwardly and radially outwardly with said external surface located radially a short distance from the internal surface of said outer sleeve member, and a radially split ring member removably secured to the axially outer end face of said outer sleeve member and having a frusto-conically shaped external surface portion defined by a surface extending axially outwardly and radially outwardly, and a hub in said wheel having a through bore defined by a first frusto-conically shaped surface matably frictionally engageable with said frusto-conically shaped surface on said outer sleeve member and with a second frusto-conically shaped surface matably frictionally engagable with said frusto-conically shaped surface on said ring member, a brake drum, means for securing said brake drum to said hub at its axially inboard side.

6. The combination comprising a wheel, a spindle having an axially inwardly disposed shoulder means for providing an engaging surface, a bearing assembly for rotatably supporting said wheel on said spindle comprising a pair of bearings having inner and outer races and having said inner races disposed upon said spindle, an inner sleeve member of a preselected length disposed about said spindle and located intermediate said bearings and in abutting relation with said inner races, an outer sleeve member disposed concentrically with respect to said inner sleeve member and having a pair of radially inwardly extending shoulders axially spaced a preselected distance in accordance with said preselected length of said inner sleeve and each being engageable with the outer race of one of said bearings, means disposed on the axially outer end of said spindle for engaging said inner race of the outermost one of said pair of bearings and for axially securing said inner races and said inner sleeve against said shoulder means on said spindle, said outer sleeve member having its axially innermost external surface frusto-conically shaped as defined by an external surface extending axially inwardly and radially outwardly with said external surface located radially a short distance from the internal surface of said outer sleeve member and being disposed substantially in radial alignment with the axially innermost one of said bearings upon assembly of said innermost bearing with said outer sleeve member and a split ring member removably secured to the axially outer end of said outer sleeve member and having a frusto-conically shaped external surface portion defined by a surface extending axially outwardly and radially outwardly and being disposed substantially in radial alignment with the axially outermost one of said bearings upon assembly of said outermost bearing and said ring member with said outer sleeve member, and a hub in said wheel having a through bore defined by a first frusto-conically shaped surface matably frictionally engageable with said frusto-conically shaped surface on said outer sleeve member and with a second frusto-conically shaped surface matably frictionally engageable with said frusto-conically shaped surface on said ring member, a brake drum, means for securing said brake drum to said hub at its axially inboard side.

7. The combination comprising: a wheel and brake drum assembly, including a wheel, a brake drum, and means securing said wheel and said brake drum for rotation together; said wheel and brake drum assembly having a hub with a centrally disposed through bore; a spindle having axially inwardly disposed shoulder means for providing an engaging surface; a bearing assembly for rotatably supporting said wheel on said spindle comprising a pair of bearings having inner and outer races disposed upon said spindle, an inner sleeve member of a preselected length disposed about said spindle and located intermediate said bearings and in abutting relation with said inner races, and an outer sleeve member having a pair of radially internally disposed shoulders axially spaced a preselected distance in accordance with said preselected length of said inner sleeve and having said internally disposed shoulders in abutting relation with said outer races; means disposed on the axially outer end of said spindle for engaging said inner race of the axially outermost one of said pair of bearings and adapted to axially secure said inner races and said inner sleeve against said shoulder means on said spindle, first means located radially a short distance from the internal surface of said outer sleeve member and disposed externally on said outer sleeve member for frictionally engaging a portion of the surface defining a portion of said through bore in said hub for supporting said hub and for limiting relative axial movement between said hub and said sleeve member in one axial direction; a ring member removably secured to the axially outer end of said outer sleeve member and engagable with a different surface on said hub for limiting relative axial movement between said hub and said ring member in an opposite axial direction.

References Cited by the Examiner

UNITED STATES PATENTS

| | | | |
|---|---|---|---|
| 1,165,432 | 12/15 | Michaud | 308—210 |
| 1,778,822 | 10/30 | Ackerman | 308—236 X |
| 2,474,283 | 6/49 | Simpkins | 308—211 XR |
| 2,660,490 | 11/53 | Jones | 308—180 |
| 2,688,520 | 9/54 | Covington | 308—187.1 |
| 3,009,742 | 11/61 | Rabe | 301—9 |

FRANK SUSKO, *Primary Examiner.*

ROBERT C. RIORDON, *Examiner.*

UNITED STATES PATENT OFFICE
CERTIFICATE OF CORRECTION

Patent No. 3,156,506                         November 10, 1964

Hudson B. Scheifele et al.

It is hereby certified that error appears in the above numbered patent requiring correction and that the said Letters Patent should read as corrected below.

Column 3, line 62, for "in" read -- is --; column 5, line 10, for "threaded position" read -- threaded portion --; column 6, line 18, for "mean" read -- means --; column 7, line 14, after "said" insert -- inner --.

Signed and sealed this 3rd day of August 1965.

(SEAL)
Attest:

ERNEST W. SWIDER                                  EDWARD J. BRENNER
Attesting Officer                                      Commissioner of Patents